United States Patent
Hanada et al.

(10) Patent No.: US 6,908,668 B2
(45) Date of Patent: Jun. 21, 2005

(54) FOAMED POLYOLEFIN RESIN SHEET

(75) Inventors: Satoshi Hanada, Ibaraki (JP); Ryuma Kuroda, Ibaraki (JP)

(73) Assignee: Sumitomo Chemical Company, Limited, Osaka (JP)

(*) Notice: Subject to any disclaimer, the term of this patent is extended or adjusted under 35 U.S.C. 154(b) by 22 days.

(21) Appl. No.: 09/993,678

(22) Filed: Nov. 27, 2001

(65) Prior Publication Data

US 2002/0127389 A1 Sep. 12, 2002

(30) Foreign Application Priority Data

Nov. 30, 2000 (JP) ........................................ 2000-364496

(51) Int. Cl.$^7$ .............................. B32B 3/26; B32B 7/12; C08J 9/00; C08F 110/00
(52) U.S. Cl. ................................ 428/304.4; 428/316.6; 428/318.8; 428/36.5; 428/319.3; 428/319.7; 428/319.9; 521/79; 521/134; 521/143; 521/144
(58) Field of Search ........................... 428/316.6, 318.8, 428/36.5, 319.3, 319.7, 319.9; 521/143, 79, 134, 144

(56) References Cited

U.S. PATENT DOCUMENTS

| | | | | |
|---|---|---|---|---|
| 4,990,562 A | * | 2/1991 | Chou et al. ................... | 525/58 |
| 5,116,881 A | * | 5/1992 | Park et al. ................... | 521/143 |
| 5,164,258 A | * | 11/1992 | Shida et al. ............. | 428/319.3 |
| 6,183,863 B1 | * | 2/2001 | Kawachi et al. ....... | 428/355 AC |
| 6,573,352 B1 | * | 6/2003 | Tatsumi et al. ............. | 526/351 |

| | | | | |
|---|---|---|---|---|
| 2001/0041236 A1 | * | 11/2001 | Usui et al. .................. | 428/36.5 |

FOREIGN PATENT DOCUMENTS

| | | | | |
|---|---|---|---|---|
| EP | WO 94/07930 | * | 4/1994 | ......... C08F/299/00 |
| JP | 2001113654 A | * | 4/2001 | ........... B32B/27/32 |

OTHER PUBLICATIONS

English Abstract of JP 2001113654A (see above for auther, title, and date).*
Computer translation of JP 2002–266511. Date: Jun. 2002; Country: Japan; Name: Hanada et al.*
JP 07252311 A Abstract in English.*

* cited by examiner

*Primary Examiner*—Terrel Morris
*Assistant Examiner*—Victor S Chang
(74) *Attorney, Agent, or Firm*—Sughrue Mion, PLLC

(57) ABSTRACT

An object of the present invention is to provide a foamed polyolefin resin sheet which exhibits a high adhesive strength when laminated with a layer formed of a saponified ethylene-vinyl ester copolymer and which still exhibits a high adhesive strength even when laminated with a layer of a thermoplastic resin having relatively low polarity such as a polyolefin resin. This object is attained by a foamed polyolefin resin sheet including a foamed polyolefin resin layer and a non-foamed surface layer formed of a thermoplastic resin composition having an A1/A2 ratio falling within a range between $1\times10^{-8}$ and $1\times10^{-1}$, wherein A1 is a maximum absorbance of the infrared absorption spectrum of the thermoplastic resin composition within an infrared ray wave number region of from 1700 to 1750 cm$^{-1}$ and A2 is a maximum absorbance of the infrared absorption spectrum of the thermoplastic resin composition within an infrared ray wave number region of from 1455 to 1465 cm$^{-1}$.

1 Claim, 2 Drawing Sheets

FOAMED POLYOLEFIN RESIN SHEET

This application claims the benefit of foreign application Japan 2000-364496, filed Nov. 30, 2000.

FIELD OF THE INVENTION

The present invention relates to a foamed polyolefin resin sheet which exhibits a high adhesive strength when laminated with a layer of a saponified ethylene-vinyl ester copolymer and which still exhibits a high adhesive strength even when laminated with a layer of a polyolefin resin having relatively low polarity or with a layer of a resin having relatively high polarity such as a polyamide resin, polyester resin, or polyvinylidene chloride (PVDC).

BACKGROUND OF THE INVENTION

Foamed polyolefin resin sheets having respective foamed layers are widely used as construction•earthmoving materials, air-conditioning equipment parts, refrigerating•freezing equipment parts, vehicle•vessel materials, container-wrapping materials and the like by virtue of their excellent heat insulating property and light-weight property.

In the field of container-wrapping, in particular, there is advantageously used a foamed polyolefin resin sheet laminated with a non-stretched polypropylene film (CPP film) having a sealing property or with a layer of a barrier resin for long-term storage of contents such as foodstuff without deterioration by oxidation.

Though conventional foamed polyolefin resin sheets exhibit a sufficient adhesive strength when laminated with a polyolefin film, they have a drawback that they exhibit a low adhesive strength when laminated with a layer formed of a saponified ethylene-vinyl ester copolymer.

In view of the foregoing problem, an object of the present invention is to provide a foamed polyolefin resin sheet which exhibits a high adhesive strength when laminated with a layer formed of a saponified ethylene-vinyl ester copolymer and which still exhibits a high adhesive strength even when laminated with a layer of a thermoplastic resin having relatively low polarity such as a polyolefin resin.

SUMMARY OF THE INVENTION

The inventors of the present invention have found that a foamed polyolefin resin sheet comprising a foamed polyolefin resin layer and a non-foamed surface layer formed of a thermoplastic resin composition having an A1/A2 ratio falling within a range between $1 \times 10^{-8}$ and $1 \times 10^{-1}$, wherein A1 is a maximum absorbance of the infrared absorption spectrum of the thermoplastic resin composition within an infrared ray wave number region of from 1700 to 1750 $cm^{-1}$ and A2 is a maximum absorbance of the infrared absorption spectrum of the thermoplastic resin composition within an infrared ray wave number region of from 1455 to 1465 $cm^{-1}$, exhibits a high adhesive strength not only when laminated with a layer formed of a polyolefin resin having relatively low polarity but also when laminated with a layer formed of a saponified ethylene-vinyl ester copolymer and still exhibits a high adhesive strength even when a layer of a thermoplastic resin having relatively high polarity such as a polyamide resin, polyester resin, or PVDC, and have completed the present invention.

Accordingly, the present invention provides a foamed polyolefin resin sheet comprising a foamed polyolefin resin layer and a non-foamed surface layer formed of a thermoplastic resin composition having an A1/A2 ratio falling within a range between $1 \times 10^{-8}$ and $1 \times 10^{-1}$, wherein A1 is a maximum absorbance of the infrared absorption spectrum of the thermoplastic resin composition within an infrared ray wave number region of from 1700 to 1750 $cm^{-1}$ and A2 is a maximum absorbance of the infrared absorption spectrum of the thermoplastic resin composition within an infrared ray wave number region of from 1455 to 1465 $cm^{-1}$.

DETAILED DESCRIPTION OF THE INVENTION

Figure 1:
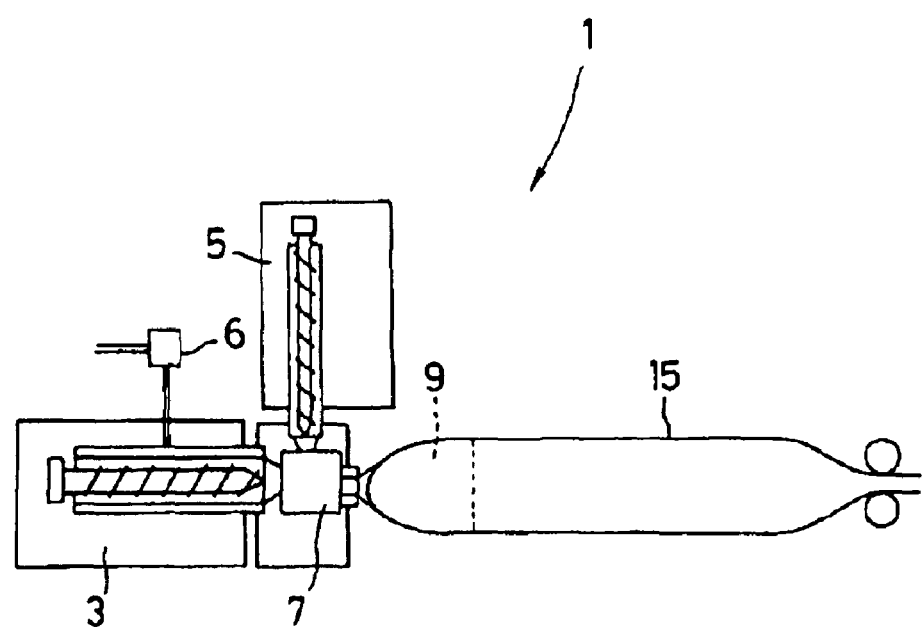
FIG. 1 is a schematic view illustrating a preferred construction of foamed polyolefin resin sheet manufacturing apparatus.

The foamed polyolefin resin sheet of the present invention is characterized by comprising at least one foamed polyolefin resin layer and a non-foamed surface layer on at least one side of the foamed polyolefin resin layer, the non-foamed surface layer being formed of a thermoplastic resin composition having an A1/A2 ratio falling within a range between $1 \times 10^{-8}$ and $1 \times 10^{-1}$, wherein A1 is a maximum absorbance of the infrared absorption spectrum of the thermoplastic resin composition within an infrared ray wave number region of from 1700 to 1750 $cm^{-1}$ and A2 is a maximum absorbance of the infrared absorption spectrum of the thermoplastic resin composition within an infrared ray wave number region of from 1455 to 1465 $cm^{-1}$.

The adhesive strength between the foamed polyolefin resin sheet of the present invention and a layer formed of any one of different types of thermoplastic resins can be adjusted by varying the A1/A2 ratio.

In the present invention the infrared absorption spectrum of a sample is measured according to the following process. First, the sample is subjected to hot pressing at a temperature about 30 to 50° C. higher than the melting point of a major component resin contained in the sample (for example about 200° C. if the major component resin is a polypropylene resin) for three minutes and then subjected to cold pressing at 30° C. for five minutes, to form a film having a thickness of 30 to 80 $\mu$m. The film thus obtained is loaded on an infrared spectrometer (for example FT-IR spectrometer Model 1600 manufactured by PERKIN ELMER CO., LTD.) for measurement of its infrared absorption spectrum.

The thermoplastic resin composition forming the non-foamed surface layer of the foamed polyolefin resin sheet of the present invention is characterized that the ratio of A1/A2 falls within falling within a range between $1 \times 10^{-8}$ and $1 \times 10^{-1}$, wherein A1 is a maximum absorbance of the infrared absorption spectrum of the thermoplastic resin composition within an infrared ray wave number region of from 1700 to 1750 $cm^{-1}$ and A2 is a maximum absorbance of the infrared absorption spectrum of the thermoplastic resin composition within an infrared ray wave number region of from 1455 to 1465 $cm^{-1}$. The A1/A2 ratio is preferably within a range between $1 \times 10^{-6}$ and $1 \times 10^{-1}$, more preferably within a range between $1 \times 10^{-4}$ and $1 \times 10^{-1}$.

An example of such a thermoplastic resin composition having an A1/A2 ratio falling within the foregoing range is a thermoplastic resin composition comprising a polyolefin resin and a carboxylic acid-modified polyolefin resin.

From the viewpoint of an adhesive strength resulting when the foamed sheet of the present invention is laminated with a resin having high polarity such as a saponified ethylene-vinyl acetate copolymer, the amount of such a carboxylic acid-modified polyolefin resin in the composition is preferably not less than about 0.1 part by weight, more preferably not less than about 0.5 part by weight, particularly preferably not less than about 5 parts by weight, based on 100 parts by weight of the polyolefin resin. From the viewpoint of an adhesive strength resulting when the foamed sheet of the present invention is laminated with a polyolefin resin having relatively low polarity, the amount of such a carboxylic acid-modified polyolefin rein in the composition is preferably not more than about 100 parts by weight.

In the present invention the foaming ratio of the foamed layer is usually not less than about 2 times. In terms of heat insulating property, the foaming ratio of the foamed layer is not less than about 3 times. Although there is no particular limitation on the upper limit of the foaming ratio, the foaming ratio is usually not more than about 40 times. In terms of strength, the foaming ratio is preferably not more than about 10 times. The foaming ratio of the foamed layer can be adjusted by adjusting the amount of a foaming agent to be used or the conditions under which the molding process is carried out to form the foamed sheet.

The foaming ratio of the non-foamed layer is usually not less than about 1.0 times and not more than about 1.5 times, preferably not less than about 1.0 times and not more than about 1.1 times.

The thickness of the non-foamed surface layer is not particularly limited as long as the surface of the obtained foamed polyolefin resin sheet smoothness and may be determined depending on the application of the sheet or the like. The thickness of the non-foamed surface layer is usually not less than 1 $\mu$m preferably not less than 10 $\mu$m more preferably not less than 50 $\mu$m from the viewpoint of sheet rigidity. From the viewpoint of lightweight property, the non-foamed surface layer is preferably not so thick.

The thickness of the foamed polyolefin resin sheet is preferably not less than about 0.1 mm in terms of sheet rigidity and is preferably not more than about 3 mm in terms of handling property. From the viewpoint of heat insulating property, the thicker the foamed layer becomes, the more preferable.

There is no particular limitation on the polyolefin resin forming the foamed layer of the foamed polyolefin resin sheet according to the present invention. Examples of such polyolefin resins include homopolymers of olefins having 2 to 6 carbon atoms such as ethylene, propylene, butene, pentene and hexene, and olefin copolymers composed of at least two kind of monomers selected from olefins having 2 to 10 carbon atoms. Such copolymers may be block copolymers, random copolymers or graft copolymers. The foamed layer may be composed of only one polyolefin resin or plural polyolefin resins. From the viewpoint of heat resistance, the polyolefin resin is preferably a polypropylene resin, which is preferably blended with a small amount of polyethylene for improving moldability.

Particularly preferable polypropylene resins include a homopolymer of propylene and a propylene copolymer containing a propylene unit in an amount of not less than 50 mol %. Preferable examples of the component copolymerizing with propylene in such propylene copolymer include ethylene and $\alpha$-olefin having 4 to 10 carbon atoms.

Examples of $\alpha$-olefin having 4 to 10 carbon atoms include 1-butene, 4-methylpentene-1, 1-hexene, and 1-octene. As the contents of monomer units other than propylene in the polypropylene copolymer, the content of ethylene unit is preferably not more than 10% by weight, while the content of $\alpha$-olefin unit is preferably not more than 30% by weight.

Preferable among such polypropylene resins are: (a) long-chain branched polypropylene, and (b) polypropylene obtained by a process including a first step of producing crystalline polypropylene having a intrinsic viscosity of not less than 5 dl/g and a second step of continuously producing crystalline polypropylene having an intrinsic viscosity of less than 3 dl/g, wherein: the content of the polypropylene obtained by the first step is 0.05% to 25% by weight; the intrinsic viscosity of the polypropylene as a whole is less than 3 dl/g; and Mw/Mn is less than 10.

Any one of a so-called chemically foaming agent and a so-called physically foaming agent may be used as the foaming agent used to form the foamed layer. Examples of usable chemically foaming agents include thermal decomposition-type foaming agents producing nitrogen gas such as azodicarbonamide, azobisisobutyronitrile, dinitrosopentamethylenetetramine, p-toluenesulfonyl hydrazide, and p,p'-oxy-bis(benzenesulfonyl hydrazide), and thermal decomposition-type inorganic foaming agents producing carbon dioxide gas such as sodium bicarbonate, ammonium carbonate, and ammonium bicarbonate. Examples of usable physically foaming agents include propane, butane, water, and carbon dioxide gas. Among them, substances that are inactive with respect to a high-temperature condition or fire, such as water and carbon dioxide gas, are suitable. Use of carbon dioxide gas is suitable particularly where a polypropylene resin is used for the foamed layer.

In the present invention the amount of the foaming agent used is not critical and may be appropriately adjusted depending on the type of foaming agent, the type of resin to be foamed or the like so as to obtain a desired foaming ratio.

There is no particular limitation on the polyolefin resin forming the non-foamed surface layer of the foamed polyolefin resin sheet according to the present invention. Examples of such polyolefin resins include homopolymers of olefins having 2 to 6 carbon atoms such as ethylene, propylene, butene, pentene, and hexene, and olefin copolymers each composed of at least two kinds of monomers selected from olefins having 2 to 10 carbon atoms. Such copolymers may be block copolymers, random copolymers, or graft copolymers. The foamed layer may be composed of only one polyolefin resin or plural polyolefin resins. Among such polyolefin resins, a long-chain branched polyolefin is preferred in suppressing foam breaking thereby obtaining a foamed polyolefin resin sheet having a favorable appearance. Long-chain branched polypropylene is particularly preferable from the viewpoint of heat resistance.

As the carboxylic acid-modified polyolefin resin used in the non-foamed surface layer of the foamed polyolefin resin sheet according to the present invention there can be mentioned an olefin polymer graft-modified with unsaturated carboxylic acid or an anhydride thereof. Examples of such graft-modified olefin polymers include maleic anhydride graft-modified polyolefins such as a maleic anhydride graft-modified ethylene polymer and a maleic anhydride graft-modified propylene polymer. From the viewpoint of heat resistance, the maleic anhydride graft-modified propylene polymer is particularly preferable. Examples of commercially-available products include ADMER (trade name) (QF series of PP base type) produced by MITSUI KAGAKU CO.

Where the carboxylic acid-modified polyolefin resin is used, the weight ratio of carboxyl group in the resin is preferably 0.01% to 1% by weight from the viewpoint of an adhesive strength resulting when the foamed sheet is laminated with a resin having high polarity as described above and an adhesive strength when the foamed sheet is laminated with a polyolefin resin having relatively low polarity.

The non-foamed surface layer may contain one or more thermoplastic resins having relatively high polarity such as a saponified ethylene-vinyl ester copolymer, polyvinyl alcohol, polyester resin, polyamide resin, and polyvinylidene chloride, in addition to the foregoing polyolefin resin and carboxylic acid-modified polyolefin resin.

By blending such a resin having relatively high polarity in the non-foamed surface layer, it is possible to further enhance the adhesive strength resulting when the foamed polyolefin resin sheet of the present invention is laminated with a layer formed of the same resin or a resin material having polarity comparable to the resin blended in the non-foamed surface layer. For example, when a saponified ethylene-vinyl ester copolymer is blended in the non-foamed surface layer, a higher adhesive strength results when the sheet of the present invention is laminated with a layer formed of the saponified ethylene-vinyl ester copolymer.

In the case where the non-foamed surface layer is incorporated with a resin such as a saponified ethylene-vinyl ester copolymer, polyvinyl alcohol, polyester resin, polyamide resin, or polyvinylidene chloride, the amount of such a resin used in the non-foamed surface layer is preferably not less than 0.1 part by weight based on 100 parts by weight of the polyolefin resin contained in the non-foamed surface layer with a view to enhancing the adhesive strength and not more than 40 parts by weight in view of an adhesive strength resulting when the non-foamed surface layer is laminated with a layer of a polyolefin resin.

The resin forming the non-foamed surface layer of the foamed polyolefin resin sheet according to the present invention may be blended with a resin recycled from scrap of foamed polyolefin resin sheets, foamed thermoplastic resin sheets, thermoplastic resin films or the like or from remnants produced in the manufacture of such resin sheets or films. The amount of such a resin recycled from scrapped resin sheet or films or remnants is not particularly limited but is preferably 30% to 100% by weight of the total amount of resins forming the non-foamed surface layer.

By incorporating such a resin recycled from scrap or remnants into the non-foamed surface layer it is possible to reduce the cost required in manufacturing the foamed polyolefin resin sheet of the present invention.

The foamed polyolefin resin sheet is not particularly limited on its layered structure as long as it comprises at least one foamed layer and a non-foamed surface layer on at least one side of the foamed layer. From the viewpoint of easy manufacturing, the foamed polyolefin resin sheet preferably has three layers arranged into a structure of non-foamed surface layer/foamed layer/non-foamed surface layer or five layers arranged into a structure of non-foamed surface layer/foamed layer/non-foamed layer/foamed layer/non-foamed surface layer.

The foamed polyolefin resin sheet of the present invention may comprise anon-foamed layer containing a long-chain branched polyolefin resin between the foamed polyolefin resin layer and the non-foamed surface layer. The provision of the non-foamed layer containing a long-chain branched polyolefin resin may make it possible to suppress deterioration of the surface condition of the sheet due to foam breaking of the foamed layer, thereby providing the sheet with a favorable appearance.

Even in the sheet provided with the non-foamed layer containing a long-chain branched polyolefin resin between the foamed layer and the non-foamed surface layer, the A1/A2 ratio greater than $1\times10^{-1}$ is not preferable because the adhesive strength of the non-foamed layer containing a long-chain branched polyolefin resin that adjoins to the non-foamed surface layer lowers.

The long-chain branched polyolefin resin is particularly preferably a long-chain branched polyolefin resin having a branching degree index [A] satisfying $0.20 \leq [A] \leq 0.98$. Since such a long-chain branched polyolefin resin having a branching degree index [A] satisfying $0.20 \leq [A] \leq 0.98$ exhibits a high strength in a molten state, the provision of the non-foamed layer containing such a resin adjoining to the foamed polyolefin resin layer makes it possible to prevent the occurrence of unevenness due to breaking of foam, particularly breaking of cells that are present adjacent the surface of the foamed layer, thereby preventing the surface of the foamed polyolefin resin sheet from becoming rough, thus resulting in the sheet having a favorable appearance. An example of such a preferable long-chain branched polyolefin resin is POLYPROPYLENE PF-814 commercially available from MONTEL CO.

The branching degree index is indicative of the degree of long-chain branching and is a value defined by the following expression:

Branching degree index $[A]=[\eta]Br/[\eta]Lin$ where $[\eta]Br$ is the intrinsic viscosity of a long-chain branched polyolefin resin, while $[\eta]Lin$ is the intrinsic viscosity of a straight-chain polyolefin having the same repeating unit as the long-chain branched polyolefin resin and a weight-average molecular weight equal to that of the long-chain branched polyolefin resin.

The "intrinsic viscosity" also called "limiting viscosity number" particularly depends upon the molecular weight and branching degree of polymer molecule. Accordingly, the intrinsic viscosity serves as a measure of the branching degree of a polymer in comparing a long-chain branched polymer with a straight-chain polymer having the same weight-average molecular weight. Thus, the ratio between the foregoing intrinsic viscosities is used as the branching degree index. The method of measuring the intrinsic viscosity of polypropylene is described in Elliot et al., [J. Appl. Polym. Sci., 14, 2947–2963 (1970)]. The intrinsic viscosity of polypropylene can be measured using a sample prepared by dissolving polypropylene in tetralin or orthodichlorobenzene at 135° C. for example. The weight-average molecular weight (Mw) of a resin can be measured by various methods, among which the method published in "American Laboratory, May, 63–75 (1978)" by M. L. McConnel, i.e., low-angle laser light scattering intensity measuring method, is particularly preferable.

The foamed polyolefin resin sheet of the present invention may be laminated with a layer of a thermoplastic resin on the surface layer thereof. A saponified ethylene-vinyl ester copolymer is particularly preferable as the thermoplastic resin to be laminated on the foamed sheet.

Other thermoplastic resins include polyolefin resins composed of a resin having relatively low polarity such as low-density polyethylene, high-density polyethylene, ethylene-propylene copolymer, ethylene-butene copolymer, ethylene-hexene copolymer, ethylene-octene copolymer, or polypropylene; and resins having relatively high polarity such as polyvinyl alcohol, polyester resin, polyamide resin, halogen-containing resin for example polyvinylidene chloride, ethylene-vinyl ester copolymer, acrylic resin for example ethylene-(meth)acrylic acid ester copolymer, acrylonitrile resin, and ionomer resin. So-called modified resins obtained by subjecting these resins to graft-modification, crosslinking or molecular chain terminal modification may also be used.

The thermoplastic resin layer to be laminated on the foamed polyolefin resin sheet of the present invention may be of any form, for example, film, sheet, non-woven fabric or net, without any particular limitation.

Examples of processes for laminating such a thermoplastic resin layer on the foamed polyolefin resin sheet of the present invention include an extrusion lamination process, a sandwich lamination process for laminating the foamed polyolefin resin sheet with a sheet or film of a thermoplastic resin by melt-extruding another thermoplastic resin such as polypropylene between the two, and a process for laminating the foamed polyolefin resin sheet with a thermoplastic resin sheet or film by heat-melting the surface of at least one of the foamed sheet and the thermoplastic resin sheet or film using hot air or an infrared heater.

A lamination process that is particularly preferred in view of the lightweight property and the cost of the foamed sheet is a thermolaminating process which laminates the foamed sheet with a thermoplastic resin layer by passing through nip rolls composed of two or more rolls, applying hot air to the nip portion of the nip rolls from an air knife or the like to heat-melt the surface of at least one of the foamed sheet and the thermoplastic resin layer, and compression-bonding the two to each other by means of the nip rolls.

The adhesive strength resulting when the foamed polyolefin resin sheet of the present invention is laminated with a thermoplastic resin is measured by, for example, the following method.

A laminate comprising the foamed polyolefin resin sheet and another thermoplastic resin is used. A sample cut to a predetermined size out of the laminate is measured for adhesive strength by peeling the thermoplastic resin layer from the foamed polyolefin resin sheet at a constant speed with use of AUTOGRAPH for example.

The foamed polyolefin resin sheet of the present invention may contain appropriate additives. Such additives include an antioxidant, light stabilizer, ultraviolet absorber, anti-fogging agent, anti-mist agent, plasticizer, antistatic agent, lubricant, coloring agent, dioxin inhibitor, ethylene gas absorber, deodorizer, freshness keeping agent, and anti-fungus agent.

These additives may be incorporated either in the foamed layer or in the non-foamed surface layer, or both.

Such additives may be incorporated in the foamed sheet by using a resin composition previously prepared by kneading the constituent resins of the foamed polyolefin resin sheet of the present invention together with the additives or using a master batch of the additives or dry-blending the additives, per se, in the manufacture of the foamed polyolefin resin sheet of the present invention.

Examples of antioxidants include phenolic antioxidants such as 2,5-di-t-butylhydroquinone, 2,6-di-t-butyl-p-cresol, 4,4'-thiobis-(6-t-butylphenol), 2,2'-methylene-bis(4-methyl-6-t-butylphenol), octadecyl-3-(3',5'-di-t-butyl-4'-hydroxyphenyl) propionate, and 4,4'-thiobis-(6-t-butylphenol); phosphoric antioxidants such as phenyldiisodecylphosphite, diphenylisooctylphosphite, triphenyl phosphite, trinonylphenyl phosphate, tris-(2,4-di-t-butylphenyl) phosphite, 4,4'-isopropylidenediphenolalkyl phosphate, 1,1,3-tris(2-methyl-4-di-tridecyl) phosphate, and 5-t-butylphenylbutanephenyldi(tridecyl) phosphite; and sulfuric antioxidants such as dilauryl 3,3'-thiodipropionate, ditridecyl 3,3'-thiodipropionate, dimyristyl 3,3'-thiodipropionate, distearyl 3,3'-thiodipropionate, laurylstearyl 3,3'-thiodipropionate, bis[2-methyl-4-(3-n-alkylthiopropionyloxy-5-t-butylphenyl)]sulfide, pentaerythritoltetra(â-lauryl-thiopropionate) ester, 2-mercaptobenzimidazol, and 2-mercapto-6-methylbenzimidazole.

The foamed polyolefin resin sheet of the present invention may contain inorganic filler with a view to enhancing the rigidity thereof. Such a filler may be contained in one or two or more of the foamed layer, non-foamed layer and non-foamed surface layer, and it is particularly preferred in improving the rigidity of the foamed polyolefin resin sheet without increasing the weight of the foamed sheet that the filler be contained in the non-foamed surface layer only.

Examples of inorganic fillers include silicon oxide, aluminum oxide, titanium oxide, magnesium oxide, aluminum hydroxide, magnesium hydroxide, calcium carbonate, magnesium carbonate, calcium sulfate, barium sulfate, magnesium sulfate, talc, clay, and mica. In view of improvements in rigidity and flexural modulus, talc and magnesium sulfate are particularly preferable.

The amount of such a filler to be used is preferably within the range of from 5 to 150 parts by weight based on 100 parts by weight of resin. In the case where it is less than 5 parts by weight, sufficient improvement in rigidity may not be achieved, while in the case where it is more than 150 parts by weight, the resulting foamed polyolefin resin sheet may have an extremely increased weight. For the weight and the rigidity of the sheet be in balance, use of the inorganic filler in an amount ranging from 40 to 70 parts by weight based on 100 parts by weight of resin is particularly preferable.

There is no particular limitation on the process for manufacturing the foamed polyolefin resin sheet of the present invention. However, there is preferably used a process including: extruding molten resin through a flat die (T-die, coat hanger die or the like), straight die, circular die (crosshead die or the like) or the like; and stretching the extruded resin while allowing the resin to be foamed. Also preferable is a process including: extruding molten resin through a die; allowing the resin to be foamed; and thereafter stretching the resin.

Examples of processes for stretching the extruded sheet include a process such as to take up the extruded sheet along an internal mandrel, and a process such as to inflate the sheet extruded from a circular die by means of air blow.

The bore of such a circular die is preferably not less than 50 mmφ, more preferably not less than 80 mmφ.

In stretching the sheet extruded from the circular die, the stretch ratio is preferably not less than 2 times and not more than 10 times, more preferably not less than 2.5 times and not more than 10 times, particularly preferably not less than 3 times and not more than 10 times. If the stretch ratio is less than 2 times, wrinkles may be on the sheet surface. On the other hand, if the stretch ratio is more than 10 times, the sheet may break during stretching. The "stretch ratio", herein used, means the ratio of the inner diameter of the sheet having been drawn along the internal mandrel or inflated by means of air blow to the bore of the circular die.

In manufacturing a foamed polyolefin resin sheet foamed to a foaming ratio of 3 to 40 times, it is sufficient to appropriately adjust the amount of the foaming agent to be used so as to attain a desired foaming ratio. Also, it is possible to adjust the cell wall density and the average cell diameter of the foamed layer by selecting a thermoplastic resin having an appropriate melt viscosity as the resin forming the foamed layer.

An example of a process for manufacturing the foamed polyolefin resin of the present invention is described below with reference to the drawings.

In this example there are used polypropylene as a foamed layer, a resin mixture comprising 100 parts by weight of polypropylene and 20 parts by weight of maleic anhydride-modified polypropylene as a non-foamed surface layer, and carbon dioxide gas as a foaming agent to form a foamed polyolefin resin sheet having a three-layered structure of non-foamed surface layer/foamed layer/non-foamed surface layer.

FIG. 1 illustrates an example of apparatus for manufacturing the foamed polyolefin resin sheet of the present invention. Apparatus 1 includes an extruder 3 adapted to extrude a foamed layer forming material, an extruder 5 adapted to extrude a non-foamed surface layer forming material, a die 7, a mandrel 9, and a take-up device 11.

The extruder 3 is provided with a pump 6 for supplying carbon dioxide gas as the foaming agent. The propylene resin introduced into the cylinder of the extruder 3 from a hopper is melted while being fed toward the die 7 by means of screw. Carbon dioxide gas is supplied to the molten resin at the time the resin is sufficiently melted and is homogeneously dispersed in the resin. The propylene resin thus incorporated with the foaming agent is fed to the die 7. A configuration in which a known vented extruder is used as the extruder to force-supply carbon dioxide gas through its vent hole does not require any modification of the extruder and hence is a preferable configuration.

The resin mixture comprising 20 parts by weight of maleic anhydride relative to 100 parts by weight of polypropylene forming the non-foamed surface layer is melted and fed to the die 7 by the extruder 5. The die 7 may be of any type which has an internal structure suited for the formation of a multi-layered sheet without any particular limitation. Examples of such dies are flat die (T-die, coat hanger die or the like), straight die, and circular die (crosshead die or the like).

The foamed layer forming material and the non-foamed layer forming material are laminated with each other in a molten state within the die 7 and then extruded. The residence time for which the materials reside within the extruding die 7 after the lamination is preferably 0.1 to 20 seconds, more preferably 0.5 to 15 seconds.

A three-layered foamed sheet extruded in a tubular form from the die 7 is formed into a tube 15 having a predetermined diameter by means of the mandrel 9, cooled and then taken up in a folded state by means of the take-up roller 11. When the sheet is cut along the opposite folds, a pair of three-layered sheets is obtained. Alternatively, when the sheet is cut along one fold and spread, a single three-layered sheet having a larger width is obtained.

If two such three-layered sheets are laminated together, there is obtained a sheet having five-layered structure of non-foamed surface layer/foamed layer/non-foamed layer/foamed layer/non-foamed surface layer. It is possible to form a sheet having a multi-layered structure by further lamination.

Figure 2:
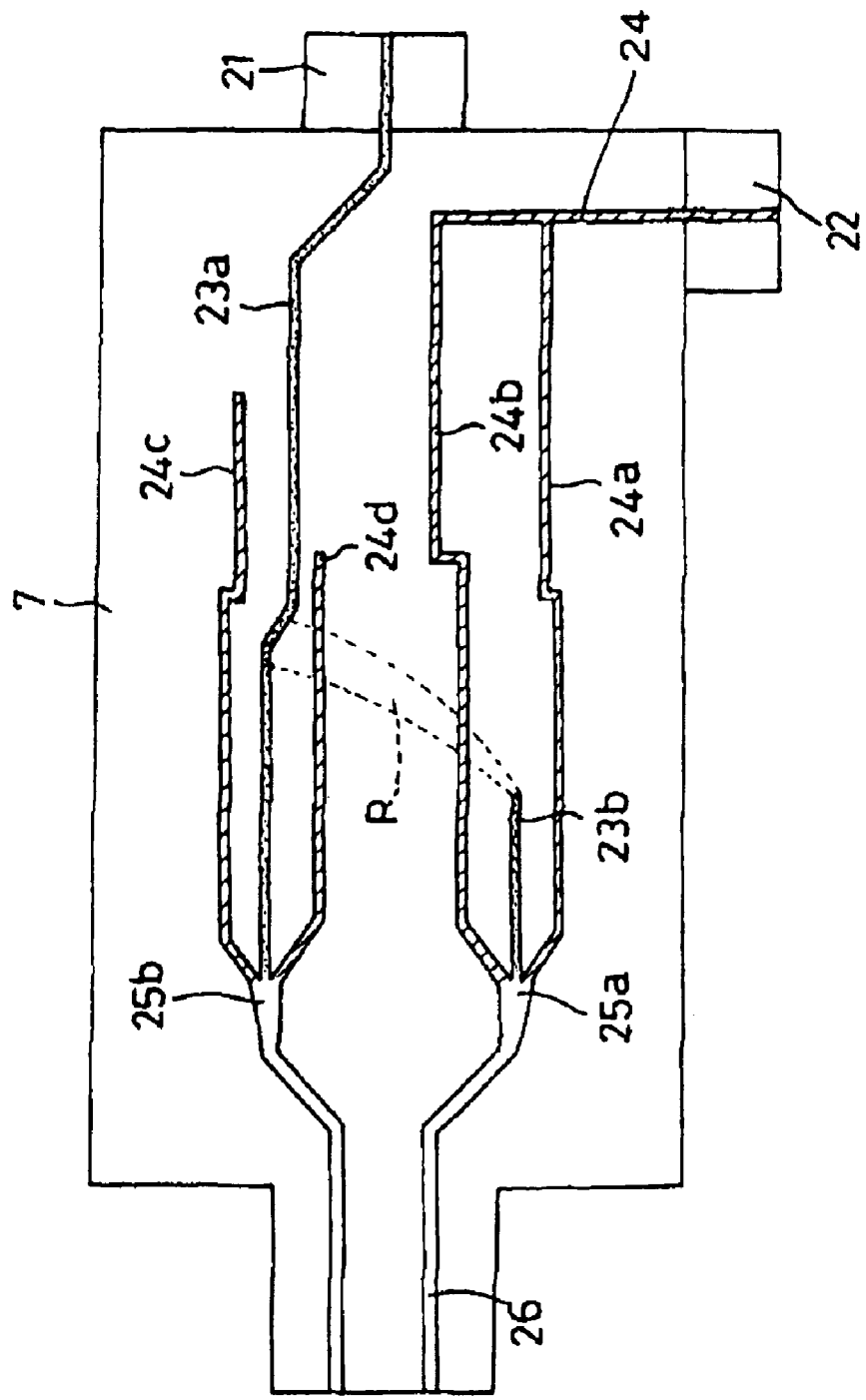
FIG. 2 is a sectional view illustrating a preferred head configuration of the foamed polyolefin resin sheet manufacturing apparatus.

A preferred die structure is shown in section at FIG. 2. The die used in this example is a circular die. The die 7 defines flow paths 23a and 23b for the resin that will form the foamed layer and flow paths 24, 24a, 24b, 24c and 24d for the resin that will form the non-foamed surface layer.

Head 21 of the extruder 3 is connected to an end portion of the die 7 on the source side of the resin flow paths, while head 22 of the extruder 5 is connected to a side portion of the die 7 on the source side of the resin flow paths. The molten resin for forming the foamed layer fed from the head 21 first enters the flow path 23a and is fed toward the outlet of the die 7. In the middle of the passage the flow of the resin is branched through a path P and then fed to the flow path 23b.

The molten resin for forming the non-foamed surface layer, on the other hand, is fed from the head 22 of the extruder 5 into the flow path 24 where the flow of the resin is divided by the flow paths 24a and 24b, then fed as adhering to the both sides of the flow path 23b so as to cover the both sides of the foamed layer, and then laminated at the flow path 25a. The molten resin fed to the flow paths 24a and 24b passes through a dividing path (not shown) analogous to the path P, is fed to the flow paths 24c and 24d so as to cover the both sides of the foamed layer passing through the flow path 23a, and then laminated at the flow path 25b.

The molten resin formed into a three-layered tube at the flow paths 25a and 25b is extruded from the die outlet 26. By thus exposing the tube to atmospheric pressure, the carbon dioxide gas contained in the foamed layer forming resin is expanded to form cells, thus forming the foamed layer.

In the manufacture of the foamed polyolefin resin sheet of the present invention, the relationship between the discharge amount of molten resin (Q: kg/h·mm) and the bore of the die 7 (D: mmφ) preferably satisfies $Q/D \geqq 0.3$ kg/h·mm, more preferably $Q/D \geqq 0.6$ kg/h·mm. The lip clearance of the die outlet 26 is preferably within the range of from about 0.5 to about 3 mm, more preferably from about 1 to about 2 mm. The cone angle of the die outlet is preferably within the range between about 0° and about 5°, more preferably between about 0° and about 1°. The length of the tapered land is preferably not more than about 10 mm, more preferably not more than about 5 mm. The angle defined between the central portion of the core of the die and the tapered land at the die outlet is preferably within the range between about 45° and about 80°, more preferably between about 50° and about 70°.

To increase the foaming ratio, it is preferred that the sheet extruded from the die be passed through a vacuum chamber. The foamed layer is further foamed in the vacuum chamber, thus affording a foamed polyolefin resin sheet having a foamed layer foamed to a higher foaming ratio.

Though any of the extruders used in the foregoing example is a single screw extruder, a twin-screw extruder or a like extruder may be used instead. Use of a twin-screw extruder as the extruder for extruding the foamed layer forming material is particularly preferable.

The foamed polyolefin sheet of the present invention may be subjected to optional processing such as molding. Specifically, the sheet of the present invention can be used in foodstuff containers such as microwave oven-ready containers (HMR), heat insulators, cushioning materials and heat insulators for use in sports goods, packing materials and the like, vehicle parts such as vehicle ceiling materials, sealing materials, building materials, applications in aircraft and outer-space industries using resin calling for heat insulating property. In particular, the sheet of the present invention can be advantageously used for foodstuff containers such as microwave oven-ready container laminated with a barrier resin layer. Examples of such foodstuff containers include trays, cups, bowl, and boxes.

Examples of processes for molding the foamed polyolefin resin sheet of the present invention include a process including the steps of: softening the foamed polyolefin resin sheet by heating with an infrared heater or the like; shaping the sheet thus softened by vacuum forming, air-pressure forming, vacuum air-pressure forming or a like process using a mold such as male mold, female mold, or a male and female mold pair; and solidifying the product by cooling, and a process not relied upon the vacuum technique or air-pressure technique and including the steps of: supplying the foamed polyolefin resin sheet into the clearance between a pair of mating molds; and shaping the sheet by pressing.

EXAMPLES

Hereinafter, the present invention will be more specifically described by way of examples and the like which show the constitution and effects of the present invention but which should not be construed to limit the present invention.

Infrared Absorption Spectrum

A resin for forming a surface layer of a foamed sheet was hot-pressed at 200° C. for three minutes, then subjected to a cold press at 30° C. for five minutes, to yield a film having a thickness of 60 μm. This film was loaded on FT-IR spectrometer (model: 1600, manufactured by PERKIN ELMER CO., LTD.) to measure its infrared absorption spectrum.

A1/A2, the ratio of maximum absorbance A1 of the infrared absorption spectrum within an infrared ray wave number region of from 1700 to 1750 $cm^{-1}$ to maximum absorbance A2 of the infrared absorption spectrum within an infrared ray wave number region of from 1455 to 1465 $cm^{-1}$, was calculated.

Adhesive Strength

A laminate comprising a foamed polyolefin resin sheet and a layer formed of a thermoplastic resin was used. A sample cut to a width of 15 mm and a length of 20 mm out of the laminate was measured as to its adhesive strength by peeling the thermoplastic resin layer from the foamed polyolefin resin sheet at a peeling speed of 300 mm/min with use of AUTOGRAPH (trade name) (model: AGS-500D, manufactured by SHIMAZU SEISAKUSHO CO.).

When the adhesive strength thus measured is less than 5 kg/15 mm, the laminate is inferior in adhesion. When the measured adhesive strength is more than 5 kg/15 mm, the laminate has proper adhesion.

Appearance

The appearance of non-foamed surface layer of a foamed sheet was visually observed and evaluated, and the results of evaluation are shown in Table 1 using the following symbols: ⊚: remarkably excellent. ○: excellent.

Example 1

A three-layered foamed polyolefin resin sheet comprising two types of layers arranged into a structure of non-foamed surface layer/foamed layer/non-foamed surface layer was manufactured by the method described below. The foamed sheet thus obtained was further laminated on its surface layer with a layer of a saponified ethylene-vinyl ester copolymer or propylene, and the resulting laminate was evaluated as to its physical properties. The results of the evaluation are shown in Table 1.

Foamed Layer Forming Material

As the foamed layer forming material there was used a pellet-blended mixture of polypropylene produced by a two-step polymerization process and polyethylene having a weight ratio of 70/30. The polymerization process used is described below.

(1) Synthesis of a Solid Catalyst

Into a 200 L stainless steel reactor equipped with a stirrer, the inside atmosphere of which had been replaced with nitrogen, were introduced 80 L of hexane, 6.55 mol of tetrabutoxytitanium, 2.8 mol of diisobutyl phthalate, and 98.9 mol of tetraethoxysilane, to afford a homogeneous solution. Subsequently, 51 L of a solution of butylmagnesium chloride in diisobutyl ether having a concentration of 2.1 mol/L was gradually added drop wise to the solution in the reactor in five hours, while the inside temperature of the reactor was being kept at 5° C. After the drop wise addition had been completed, the mixture in the reactor was stirred at room temperature for one hour and then separated into a solid and a liquid, followed by washing three times with 70 L of toluene. In turn, toluene was added to the reactor so as to give a slurry having a concentration of 0.6 Kg/L, to which a mixed solution of 8.9 mol of n-butyl ether and 274 mol of titanium tetrachloride was then added, followed by further addition of 20.8 mol of phthalic acid chloride. Reaction of the resulting mixture was allowed to proceed at 110° C. for three hours, followed by washing twice with toluene at 95° C. Subsequently, after having adjusted the slurry concentration to 0.6 Kg/L, 3.13 mol of diisobutyl phthalate, 8.9 mol of n-dibutyl ether and 137 mol of titanium tetrachloride were added to the slurry and the resulting mixture was reacted at 105° C. for one hour. After the completion of the reaction, the resulting mixture was separated into a solid and a liquid at the same temperature, followed by washing twice with 90 L of toluene at 95° C. Subsequently, after having adjusted the slurry concentration to 0.6 Kg/L, 8.9 mol of n-dibutyl ether and 137 mol of titanium tetrachloride were added to the slurry and the resulting mixture was reacted at 95° C. for one hour. After the completion of the reaction, the resulting mixture was separated into a solid and a liquid at the same temperature, followed by washing three times with 90 L of toluene at the same temperature. Thereafter, the slurry concentration was adjusted to 0.6 Kg/L, and then 8.9 mol of n-butyl ether and 137 mol of titanium tetrachloride were added to the slurry and the resulting mixture was reacted at 95° C. for one hour. After the completion of the reaction, the resulting mixture was separated into a solid and a liquid at the same temperature, followed by washing three times with 90 L of toluene at the same temperature. The product was further washed three times with 90 L of hexane and then dried under reduced pressure, to yield 11.0 Kg of a solid catalyst component.

The solid catalyst component contained 1.9% by weight of titanium atom, 20% by weight of magnesium atom, 8.66% by weight of phthalic acid ester, 0.05% by weight of ethoxy group, and 0.2% by weight of butoxy group, and had a favorable granular property free of fine powder.

(2) Pre-activation of the Solid Catalyst Component

Into a stainless steel autoclave having an internal volume of 3 L and equipped with a stirrer were introduced 1.5 L of n-hexane sufficiently dehydrated and deaerated, 37.5 mmol of triethylaluminum, 3.75 mmol of t-butyl-n-propyldimethoxysilane, and 15 g of the solid catalyst component. 15 g of propylene was continuously supplied to the autoclave in 30 minutes with the inside temperature of the autoclave being kept at 5° C. to 15° C., to pre-activate the solid catalyst component.

(3) Polymerization into a Propylene Polymer

First Step

While liquid propylene was supplied at a rate of 57 kg/h into a stainless steel polymerization reactor having an internal volume of 300 L so that a polymerization temperature of 60° C. and a polymerization pressure of 27 $Kg/cm^2G$ were maintained, triethylaluminum, t-butyl-n-propyldimethoxysilane and the pre-activated solid catalyst component were continuously supplied to the reactor at rates of 1.3 mmol/h, 0.13 mmol/h and 0.51 g/h, respectively, to allow propylene polymerization to proceed under the condition substantially free of hydrogen. Thus, a polymer was obtained at a rate of 2.0 kg/h. The amount of the polymer thus produced per 1 g of the catalyst was 3920 g. According to analysis of a portion sampled from the polymer, the intrinsic viscosity of the polymer was 7.7 dl/g. The polymer thus obtained was continuously fed to the second tub without deactivation.

Second Step

While propylene and hydrogen were supplied into a fluidized bed reactor having an internal volume of 1 m$^3$ so that the reactor maintained a polymerization temperature of 80° C., polymerization pressure of 18 Kg/cm$^2$G, and hydrogen concentration of 8 vol % in the gaseous phase, triethylaluminum and t-butyl-n-propyldimethoxysilane were supplied to the second tub at rates of 60 mmol/h and 6 mmol/h, respectively, together with the catalyst-containing polymer fed from the first reactor, to continue the propylene polymerization without interruption. Thus, a polymer was obtained at a rate of 18.2 kg/h. The intrinsic viscosity of the polymer thus obtained was 1.9 dl/g.

From the results thus obtained it was found that the amount of the polymer produced per 1 g of the catalyst at the second-step polymerization was 31760 g, the polymerized weight ratio between the first polymerization reactor and the second polymerization reactor was 11/89, and the intrinsic viscosity of a portion of polymer resulting from the second-step polymerization reaction was 1.2 dl/g.

(4) Pelletizing of the Polymer 100 parts by weight of powder of the polymer obtained from the above two-step reaction were admixed with 0.1 part by weight of calcium stearate, 0.05 part by weight of a phenolic antioxidant (trade name: IRUGANOX 1010, produced by Ciba Specialty Chemicals Co.) and 0.2 part by weight of a phenolic antioxidant (trade name: SUMIRISER BHT, produced by Sumitomo Chemical Co., Ltd.), and the resulting mixture was melt-kneaded at 230° C. to form a pellet having an MFR of 12.

(5) Blending of the Foamed Layer Forming Material

The pellet of the polypropylene obtained by the above process and a pellet of polyethylene (trade name: SUMIKACENE G201, produced by Sumitomo Chemical Co., Ltd.) were dry blended together at a weight ratio of 70/30.

Non-foamed Surface Layer Forming Material

As the non-foamed surface layer forming material there was used a resin mixture prepared by dry blending 100 parts by weight of polypropylene (trade name: PF814, produced by MONTEL CO., melting point: 159.0° C., crystallization temperature: 130.1° C., MFR: 2.2 g/10 min) with 20 parts by weight of maleic anhydride-modified polypropylene (trade name: ADMER QF551, produced by MITSUI KAGAKU CO., LTD., melting point: 135° C., MFR: 5.7 g/10 min).

Extrusion Foaming

Apparatus was used including a 50 mmφ twin-screw extruder (3), a 32 mmφ single-screw extruder (5), a 90 mmφ circular die (7) attached thereto. Into the hopper of the extruder (3) was introduced a raw material prepared by blending 100 parts by weight of a mixture of propylene polymer/polyethylene having a weight ratio of 70/30 as the foamed layer forming material with 1 part by weight of a nucleating agent (trade name: HYDROCEROL, produced by BERLINGUER INGERHEIM CHEMICALS CO.). 1 part by weight of carbon dioxide gas was injected into the extruder (3) at a location at which the melting of the raw material progressed, and the raw material thus mixed with the carbon dioxide gas was sufficiently kneaded and melted and then fed to the die (7). The molten mixture to be formed into the foamed layer and a molten resin to be formed into the non-foamed surface layer that was fed from the extruder (5) were laminated with each other in the die, and the resulting laminate was extruded from the die and extended 2.3-times along a 210 mmφ mandrel (9) disposed immediately down stream of the die while being cooled. The foamed sheet in a tubular form thus obtained was slit with a cutter so that the tubular form was spread into a planar foamed sheet, which in turn was taken up by a take-up device (11).

Lamination of the foamed polyolefin resin sheet with a thermoplastic resin layer.

Foamed polyolefin resin sheet (12) obtained by the process described above and a film (13) which was either a saponified ethylene-vinyl ester copolymer (EVOH) film (trade name: EVAL EF-E FILM, produced by KURARE CO., LTD., thickness: 15 μm) or a non-stretched polypropylene film (CPP) (trade name: TOYOBO "PAILENE" FILM-CT P1146, produced by TOYOBOSEKI CO., LTD., thickness: 80 μm), were passed together between a pair of nip rolls (14) adjusted to 120° C. at a line speed of 1 m/min, while hot air was applied to the nip portion from an air-knife (16) connected to a hot air generator (15) so that the temperature of hot air at the nip roll section assumed 190° C. Thus, there was obtained a laminate (17) having the foamed polyolefin resin sheet thermolaminated with the ethylene-vinyl ester copolymer film.

Example 2

A foamed polyolefin resin sheet and a laminate comprising the same were manufactured by the same process as in EXAMPLE 1 except that the following resin mixture was used as the non-foamed surface layer forming material, and were evaluated as to their physical properties. The results of the evaluation are shown in Table 1.

Non-foamed Surface Layer Forming Material

As the non-foamed surface layer forming material there was used a resin mixture prepared by dry blending 100 parts by weight of polypropylene (trade name: PF814, produced by MONTEL CO., melting point: 159.0° C., crystallization temperature: 130.1° C., MFR: 2.2 g/10 min (230° C.)) with 20 parts by weight of maleic anhydride-modified polypropylene (trade name: ADMER QF551, produced by MITSUI KAGAKUCO., LTD., melting point: 135° C., MFR: 5.7 g/10min (230° C.)) and 30 parts by weight of a saponified ethylene-vinyl ester copolymer (trade name: EVAL EPE-105, produced by KURARE CO., LTD., melting point: 165° C., MFR: 5.5 g/10 min (190° C.)).

Example 3

A foamed polyolefin resin sheet and a laminate comprising the same were manufactured by the same process as in EXAMPLE 1 except that the following resin composition was used as the non-foamed surface layer forming material, and were evaluated as to their physical properties. The results of the evaluation are shown in Table 1.

Non-foamed Surface Layer Forming Material

As the non-foamed surface layer forming material there was used a resin composition prepared by dry blending 100 parts by weight of polypropylene (trade name: PF814, produced by MONTEL CO., melting point: 159.0° C., crystallization temperature: 130.1° C., MFR: 2.2 g/10 min (230° C.)) with 20 parts by weight of maleic anhydride-modified polypropylene (trade name: ADMER QF551, produced by MITSUI KAGAKU CO., LTD., melting point: 135° C., MFR: 5.7 g/10 min (230° C.)) and 80 parts by weight of talc (trade name: MICRON WHITE #5000s, produced by HAYASHI KASEI CO., LTD., major component: magnesium silicate) and granulating the blend with a unidirectional twin-screw extruder (trade name: PCM45, manufactured by IKEGAI CO., 45 mmφ, L/D30) at 200 rpm and at a die temperature of 240° C., followed by drying.

Example 4

A foamed polyolefin resin sheet and a laminate comprising the same were manufactured by the same process as in EXAMPLE 1 except that the following resin mixture (A) and resin (B) were used as the non-foamed surface layer forming material and the non-foamed layer forming material, respectively and that the foamed polyolefin resin sheet comprised three types of layers arranged into a five-layered construction of non-foamed surface layer/non-foamed layer/foamed layer/non-foamed layer/non-foamed surface layer, and were evaluated as to their physical properties. The results of the evaluation are shown in Table 1.
Non-foamed Surface Layer Forming Material
Resin Mixture (A)

As the non-foamed surface layer forming material (A) there was used a resin mixture prepared by dry blending 100 parts by weight of polypropylene (trade name: PF814, produced by MONTEL CO., melting point: 159.0° C., crystallization temperature: 130.1° C., MFR: 2.2 g/10 min) with 20 parts by weight of maleic anhydride-modified polypropylene (trade name: ADMER QF551, produced by MITSUI KAGAKU CO., LTD., melting point: 135° C., MFR: 5.7 g/10 min).
Resin (B)

As the non-foamed layer forming material (B) there was used long-chain branched polypropylene (trade name: PF814, produced by MONTEL CO., melting point: 159.0° C., crystallization temperature: 130.1° C., MFR: 2.2 g/10 min).
Extrusion Foaming Apparatus was used including 50 mmφ twin-screw extruder (3) for foamed layer extrusion, 32 mmφ single-screw extruder (5) for non-foamed surface layer extrusion, 32mmφ single-screw extruder (5') for non-foamed layer extrusion, and 90 mmφ circular die (7) attached thereto. Into the hopper of the extruder (3) was introduced a raw material prepared by blending 100 parts by weight of a propylene polymer/polyethylene mixture having a weight ratio of 70/30 as the foamed layer forming material with 1 part by weight of a nucleating agent (trade name: HYDROCEROL, produced by BERLINGUER INGERHEIM CHEMICALS CO.). 1 part by weight of carbon dioxide gas was injected into the extruder (3) at a location at which the melting of the raw material progressed, and the raw material mixed with the carbon dioxide gas was sufficiently kneaded and melted and then fed to the die (7). The molten mixture to be formed into the foamed layer and molten resins to be formed into the non-foamed surface layer and the non-foamed layer that were fed from the extruders (5) and (5') were laminated with each other in the die, and the resulting laminate was extruded from the die and extended 2.3-times along 210 mmφ mandrel (9) disposed immediately downstream of the die while being cooled. The foamed sheet in a tubular form thus obtained was slit with a cutter so that the tubular form was spread into a planar foamed sheet, which in turn was taken up by take-up device (11).

Example 5

A foamed polyolefin resin sheet and a laminate comprising the same were manufactured by the same process as in Example 1 except that the following resin composition was used as the non-foamed surface layer forming material, and were evaluated as to their physical properties. The results of the evaluation are shown in Table 1.
Non-foamed Surface Layer Forming Material As the non-foamed surface layer forming material there was used a resin mixture prepared by blending 100 parts by weight of polypropylene (trade name: PF814, produced by MONTEL CO., melting point: 159.0° C., crystallization temperature: 130.1° C., MFR: 2.2 g/10 min (230° C.)) with 100 parts by weight of resin recycled from scrap of a foamed polyolefin resin sheet formed by laminating a multi-layered foamed sheet comprising non-foamed surface layer and foamed layer formed from a polypropylene resin and arranged into a structure of non-foamed surface layer (80 μm)/foamed layer (2200 μm)/non-foamed surface layer (80 μm) with a 100 μm-thick multi-layered film comprising non-stretched polypropylene (hereinafter abbreviated as "CCP") layer (25 μm)/maleic anhydride-modified polypropylene layer (10 μm)/saponified ethylene-vinyl ester copolymer layer (30 μm)/maleic anhydride-modified polypropylene layer (10 μm)/CCP layer (25 μm).

Comparative Example 1

A foamed polyolefin resin sheet and a laminate comprising the same were manufactured by the same process as in EXAMPLE 1 except that the following resin was used as the non-foamed surf ace layer forming material, and were evaluated as to their physical properties. The results of the evaluation are shown in Table 1.
Non-foamed Surface Layer Forming Material As the non-foamed surface layer forming material there was used 100 parts by weight of polypropylene (melting point: 159.0° C., crystallization temperature: 130.1° C., MFR: 2.2 g/10 min (230° C.)).

TABLE 1

| Item | Example 1 | Example 2 | Example 3 | Example 4 | Example 5 | Comparative example 1 |
|---|---|---|---|---|---|---|
| Total sheet thickness (mm) | 1.2 | 1.2 | 1.2 | 1.2 | 1.2 | 1.2 |
| Non-foamed surface layer thickness (mm) | 0.1 | 0.1 | 0.1 | 0.1 | 0.1 | 0.1 |
| Infrared absorption spectrum | | | | | | |
| A1 | 0.13 | 0.14 | 0.04 | 0.02 | 0.014 | 0 |
| A2 | 2.2 | 2.7 | 2.2 | 2.1 | 2.7 | 2.9 |
| A1/A2 | 0.06 | 0.05 | 0.02 | 0.01 | 0.005 | 0 |
| Non-foamed layer thickness (mm) (layer other than foamed layer and non-foamed surface layer) | 0 | 0 | 0 | 0.1 | 0 | 0 |
| Foaming ratio of non-foamed surface layer (times) | 1.0 | 1.0 | 1.0 | 1.0 | 1.0 | 1.0 |
| Foaming ratio of foamed layer (times) | 4.5 | 4.5 | 4.5 | 4.5 | 4.5 | 4.5 |
| EVOH adhesive strength (kg) | 6.2 | 6.8 | 5.6 | 6.4 | 5.9 | 4.1 |
| CPP adhesive strength (kg) | 8.2 | 8.8 | 7.7 | 8.4 | 7.9 | 8.2 |
| Appearance | ○ | ○ | ◎ | ◎ | ○ | ○ |

What is claimed is:
1. A foamed polyolefin resin sheet comprising a foamed polyolefin resin layer and a non-foamed surface layer said non-foamed surface layer formed of a thermoplastic resin composition having an A1/A2 ratio falling within a range between $1\times10^{-8}$ and $1\times10^{-1}$, wherein A1 is a maximum absorbance of the infrared absorption spectrum of the thermoplastic resin composition within an infrared ray wave number region of from 1700 to 1750 $cm^{-1}$ and A2 is a maximum absorbance of the infrared absorption spectrum of the thermoplastic resin composition within an infrared ray wave number region of from 1455 to 1465 $cm^{-1}$, said resin sheet further comprising a non-foamed layer formed of a long-chain branched polyolefin resin between the foamed layer and the non-foamed surface layer.

* * * * *